(12) United States Patent
Bulard et al.

(10) Patent No.: US 11,542,031 B2
(45) Date of Patent: Jan. 3, 2023

(54) FUEL TANK COMMUNICATION SYSTEMS

(71) Applicant: Safran Aerosystems, Plaisir (FR)

(72) Inventors: Philippe Bulard, Grand-Couronne (FR); Christophe Mendes, Saint Ouen du Tilleul (FR); Loïc Boissy, Louviers (FR); Hichem Amara, Louviers (FR)

(73) Assignee: SAFRAN AEROSYSTEMS, Plaisir (FR)

( * ) Notice: Subject to any disclaimer, the term of this patent is extended or adjusted under 35 U.S.C. 154(b) by 318 days.

(21) Appl. No.: 16/629,702

(22) PCT Filed: Jul. 11, 2018

(86) PCT No.: PCT/IB2018/055108
§ 371 (c)(1),
(2) Date: Jan. 9, 2020

(87) PCT Pub. No.: WO2019/012445
PCT Pub. Date: Jan. 17, 2019

(65) Prior Publication Data
US 2021/0147094 A1 May 20, 2021

Related U.S. Application Data

(60) Provisional application No. 62/530,956, filed on Jul. 11, 2017.

(51) Int. Cl.
*B64D 37/08* (2006.01)
*B64D 37/00* (2006.01)
(52) U.S. Cl.
CPC .......... *B64D 37/08* (2013.01); *B64D 37/005* (2013.01)

(58) Field of Classification Search
CPC ...... B64D 37/08; B64D 37/005; B64D 37/06; B60K 2015/03144; B60K 15/01
See application file for complete search history.

(56) References Cited

U.S. PATENT DOCUMENTS

| 3,035,797 | A | 5/1962 | Neuschotz |
| 4,335,905 | A | 6/1982 | Bac |
| 8,956,556 | B2 * | 2/2015 | Breay ................ B64D 45/02 252/502 |
| 10,563,800 | B2 * | 2/2020 | Waugh ................ F16L 25/023 |

(Continued)

FOREIGN PATENT DOCUMENTS

| GB | 552899 | 4/1943 |
| RU | 62087 | 3/2007 |
| WO | 2017048627 | 3/2017 |

OTHER PUBLICATIONS

European Application No. 18759385.0, Office Action dated Oct. 8, 2021, 5 pages.

(Continued)

*Primary Examiner* — Philip J Bonzell
*Assistant Examiner* — Colin Zohoori
(74) *Attorney, Agent, or Firm* — Kilpatrick Townsend & Stockton LLP

(57) ABSTRACT

Embodiments of the present invention provide a fuel tank communication system. The communication system includes a main body (30) used to connect two fuel bladder flanges (12, 20) to one another. The communication system provides two separate, independent locking features (42, 60) that can secure fuel bladders to one another.

9 Claims, 5 Drawing Sheets

(56) References Cited

U.S. PATENT DOCUMENTS

| | | |
|---|---|---|
| 2004/0140667 A1 | 7/2004 | Breay et al. |
| 2006/0099843 A1 | 5/2006 | Fullner et al. |
| 2009/0102187 A1* | 4/2009 | Carns .................... F16L 25/01 |
| | | 285/123.15 |
| 2015/0001843 A1 | 1/2015 | Bornes |

OTHER PUBLICATIONS

International Patent Application No. PCT/IB2018/055108, International Search Report and Written Opinion, dated Oct. 8, 2018.
Russian Application No. 2020105881, Office Action dated Dec. 6, 2021, 11 pages (5 pages English Translation and 6 pages Original).
Russian Application No. 2020105881, Notice of Decision to Grant dated Mar. 5, 2022, 13 pages. (7 pages of Original Document and 6 pages of English Translation).

* cited by examiner

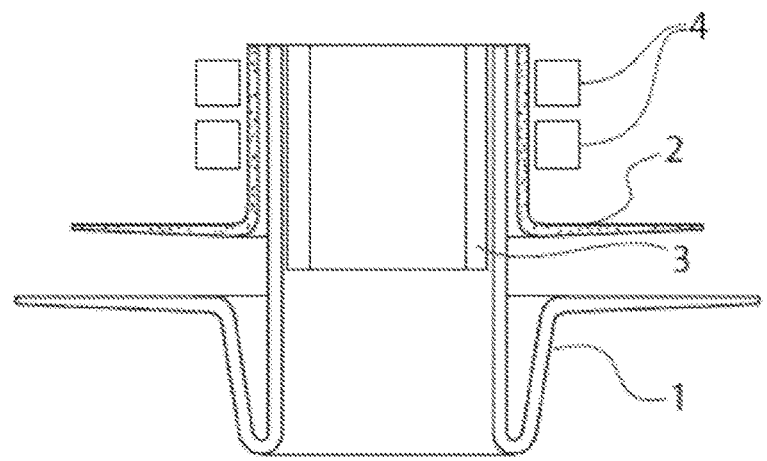
FIG. 1
PRIOR ART
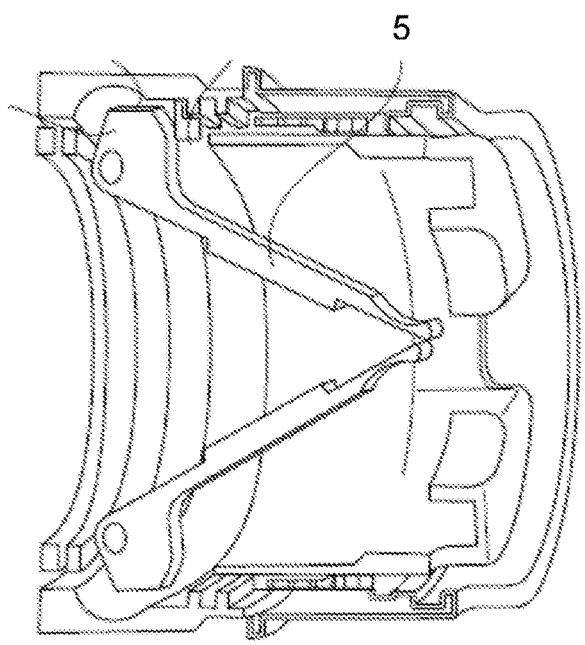
FIG. 2
PRIOR ART
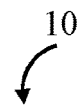

FUEL TANK COMMUNICATION SYSTEMS

CROSS REFERENCE TO RELATED APPLICATIONS

This application claims the benefit of U.S. Provisional Application Ser. No. 62/530,956, filed Jul. 11, 2017, titled "Fuel Tank Communication Systems," the entire contents of which are hereby incorporated by reference.

FIELD OF THE DISCLOSURE

Embodiments of the present invention relate generally to a connection system for use between one or more fuel bladders, which may also referred to as fuel tanks or fuel-holding cells. The system provides intercommunication between fuel bladders, allowing fuel and/or air flow therebetween. The disclosed connection may be useful for fuel transfer, venting, re-fueling, or for any other instances when intercommunication between fuel bladders or other fluid exchanging systems is desired.

BACKGROUND

Tank-to-tank connections are often required in the aerospace field, as well as other fields. For example, a tank-to-tank connection is generally needed for fuel transfer without leaks, particularly for helicopter or aircraft fuel systems. Generally, the connection between two tanks (which may be flexible material tanks or any other type of tank) is provided by a system that requires two flexible chimneys, a rigid sleeve, and metal clamps that are secured via screwdriver. Prior art FIG. 1 illustrates one example of such a prior art connection. This figure shows a first flexible chimney 1 that is first bonded to a rigid sleeve 3 on a tank. During assembly, a second flexible chimney 2 is assembled on the first flexible chimney 1 (generally using a lubricating means) and then fixed inside the tank by metal clamps 4 via a screwdriver.

The connection (fastening) process to connect the chimneys between two tanks can take some time, and in some instances, lasts around fifteen minutes. Use of a screwdriver for the metal clamps during the assembly can risk damaging the tanks or the flexible chimneys due to the constant pressure from screwing and unscrewing the clamps. The assembly also depends on the operator competence and strength during the assembly. This creates variability due to operator ability and the amount of force that s/he is able to put on the screws during the connection/tightening process. Additionally, during the lifetime of tanks, as the tanks are fixed by screwing, there can be a decrease of the clamping force. Additionally, after some time, due to rubber aging, the two flexible chimneys could begin to remain stuck together under the clamps, which can lead to a difficult disassembly and can add to maintenance issues.

Other examples of connections have included claw locks, lever locks, and other options. For example, one system embodying a lever lock 5 is illustrated by prior art FIG. 2. Additional improvements to improve these fuel tank fittings continue to be desired and necessary.

BRIEF SUMMARY

Embodiments described herein thus provide a fuel tank communication system. The communication system includes a main body used to connect two fuel bladder chimneys to one another. The communication system provides two separate, independent locking features that can secure fuel bladders to one another.

In a specific example, there is provided a fuel tank communication system that has a first chimney configured to be secured to a first fuel bladder; a second chimney configured to be secured to a second fuel bladder; each chimney comprising a central opening; a main body configured to be received by a central openings of each of the first and second chimneys, a securement feature for maintaining cooperation between the first chimney in the main body; and first and second locking systems for maintaining cooperation between the second chimney and the main body.

In one embodiment, the securement feature is a C-clip. In any of the above or below examples, the first locking system comprises a notched ring and a spring. In any of the above or below examples, the notched ring comprises a plurality of notch protrusions. In any of the above or below examples, the main body comprises at least one edge receiver configured to receive at least one notch of the notched ring. In any of the above or below examples, the at least one edge receiver comprises an edge opening and an end groove. In any of the above or below examples, it is possible for the main body to comprise a plurality of edge receivers. In any of the above or below examples, the second locking system comprises a lock ring. In any of the above or below examples, the main body comprises a seal portion. In any of the above or below examples, the main body comprises a rear shoulder. In any of the above or below examples, the first fuel bladder and second fuel bladder may be connected or disconnected via access to only one of the first or second bladders.

In another example, there is provided a method for connecting two tanks, comprising: providing any of the above described fuel tank communication systems; securing the first chimney to the main body via a securement feature; securing the second chimney to the main body via the first locking system comprising a notched ring and a spring, wherein the main body comprises an edge receiver that receives at least one notch of the notched ring; and securing the second chimney to the main body via the second locking system comprising a lock ring.

BRIEF DESCRIPTION OF THE DRAWINGS

FIG. 1 shows a prior art chimney clamp connection.
FIG. 2 shows a prior art lever lock connection.

DETAILED DESCRIPTION

Embodiments of the invention described herein provide improved connections for tanks, and particularly for fuel tanks on-board aircraft and/or helicopters and other airborne vehicles. The connections described herein may also be useful with other vehicles that require secure connections between tanks for fuel transfer or other purposes. The connections described herein may also be useful for any other types of fluid communication between two separate vessels.

The interconnection fitting system 10 shown and described is used to perform tank-to-tank connection. It may provide fuel or air transfer with minimal to no leakage in helicopter and/or aircraft fuel systems. In order to meet certain aircraft requirements, there are two separate and independent locking systems for maintaining the system 10 in a locked configuration.

The interconnection fitting system described by this disclosure provides the possibility to connect and disconnect fuel tanks only through an access to a single tank, without requiring a handling inside each of the two connected tanks. For example, the connection/disconnection can be conducted by access inside the second tank, which can allow a user to disconnect both tanks from one another.

Figure 3:
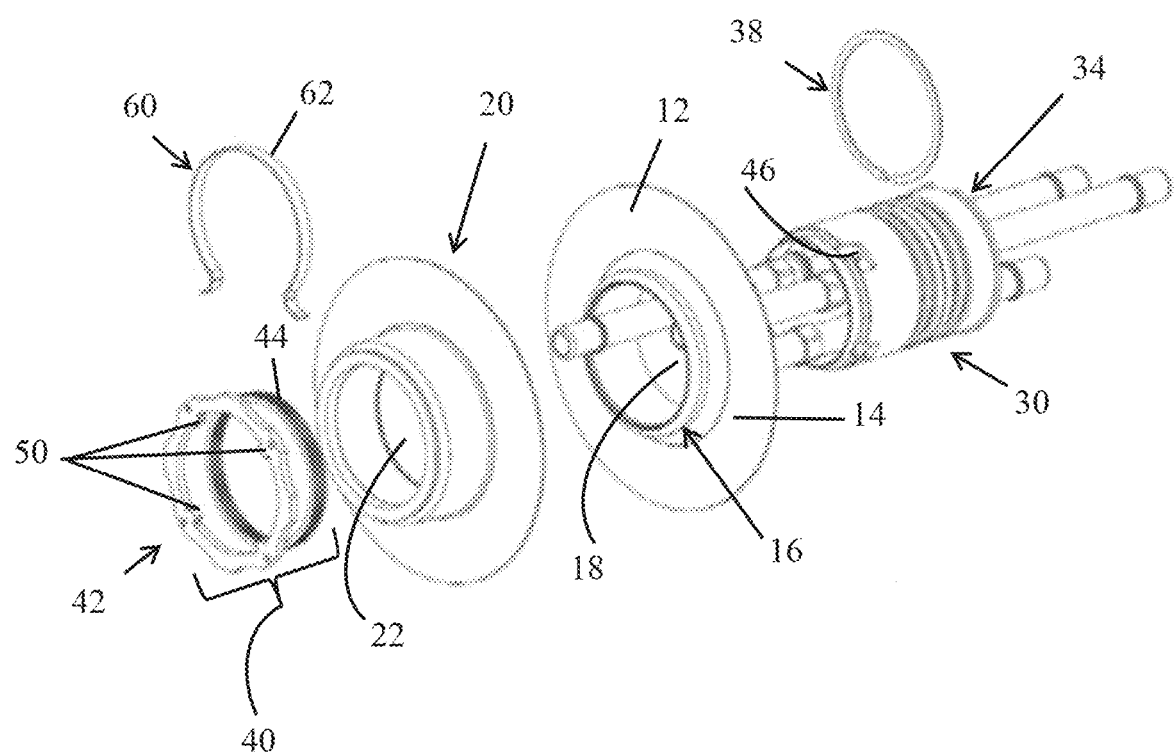
FIG. 3 shows a side exploded view of one embodiment of a fuel tank connection system described herein.

Referring now to FIG. 3, each fuel bladder or fuel tank is provided with a chimney. (For ease of review, FIG. 3 shows the chimneys without being attached to the fuel bladders/tanks.) A first chimney 12 is shown as having an outer flange 14 and a molding 16. The molding 16 encircles a central opening 18. Molding 16 may be used to help center the first chimney 12 (of a first fuel bladder) with respect to a second chimney 20 (of a second fuel bladder). Chimney 20 has a female opening 22 that corresponds in shape and dimension to the male molding 16, such that the components are designed to mate with one another. The central opening 18 of the chimney 12 is configured to receive the main body 30, as described in more detail below.

Figure 4:
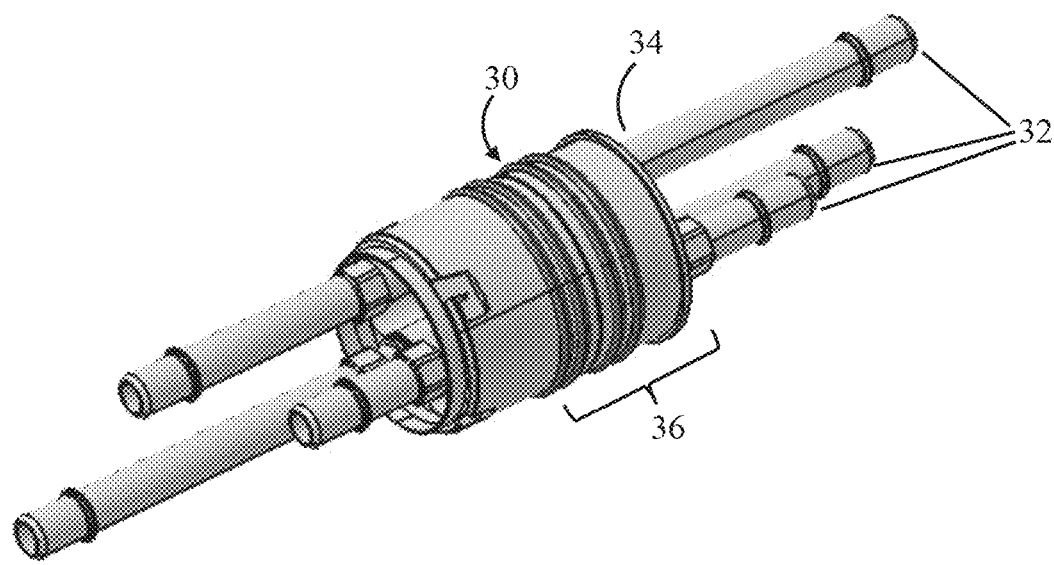
FIG. 4 shows a side perspective view of a main body.
Figure 5:
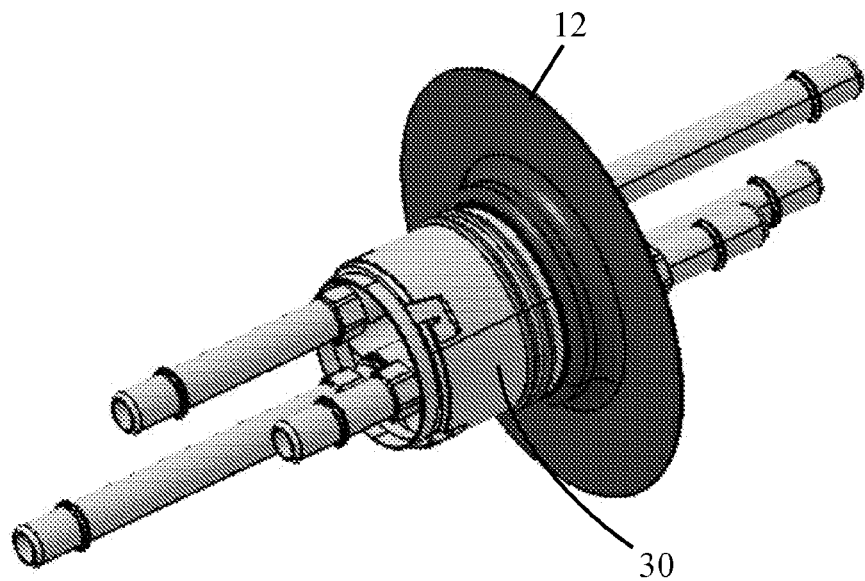
FIG. 5 shows a side perspective view of the main body of FIG. 4, with a first chimney positioned thereon.

Referring now to FIG. 4, main body 30 provides the interconnection support. Main body 30 is generally illustrated as having a circular circumference which is designed to fit within central opening 18 of chimneys 12, 20. It should be understood, however, that alternate shapes may be possible. The main body 30 has connections 32 extending therefrom. Connections 32 may function as vent tubes, re-fueling tubes, or any other uses that are understood in the art. Main body 30 also has a rear shoulder 34. In use, when the chimney 12 is positioned on main body as illustrated by FIG. 5, the rear shoulder 34 provides a stop abut for the chimney 12. A seal portion 36 of the main body 40 may help secure the chimney 12 in place and provide a non-leaking seal.

Once the chimney 12 is positioned with respect to the main body 30 (with the circumference of the main body 30 received within the central opening 18), a securement feature 38 (shown in FIG. 3) is positioned on the opposite side of the chimney 12. As shown, one example of a securement feature 38 may be a C-clip. The C-clip is generally secured to the main body 30 and maintains the position of chimney 12.

Figure 6:
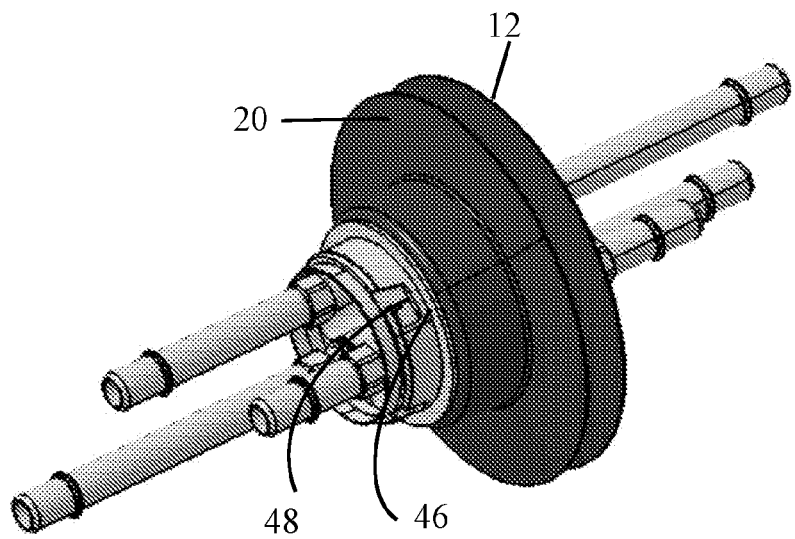
FIG. 6 shows a side perspective view of FIG. 5, with a second chimney positioned thereon.

Next, as illustrated by FIG. 6, a second chimney 20 (having a similar central opening 18 as the first chimney 12) is positioned onto main body 30. Chimney 20 may similarly be positioned over the seal portion 36 for a leak tight connection. In order to securely lock the chimney 20 with respect to the main body 30, two independent locking systems are provided. According to required standards, the intercom fitting must incorporate two separate locking devices, as a fail-safe measure, according to CS§ 29.607. A first locking system 40 features a notched ring 42 and a spring 44. A second locking system 60 features a lock ring 62.

Referring now to the first locking system 40, the main body 30 has at least one edge receiver 46. In a specific embodiment, the edge receiver 46 is formed as an L-lock or J-lock. It should be understood that optional geometries are possible and considered within the scope of this disclosure. The edge receiver 46 is generally formed as an internal notch that extends into the main body 30 from an edge opening 48. The edge receiver 46 forms an elongated groove that ends at end groove portion 54. The edge opening 48 receives a corresponding notch 50 on the notched ring 42.

Figure 7:
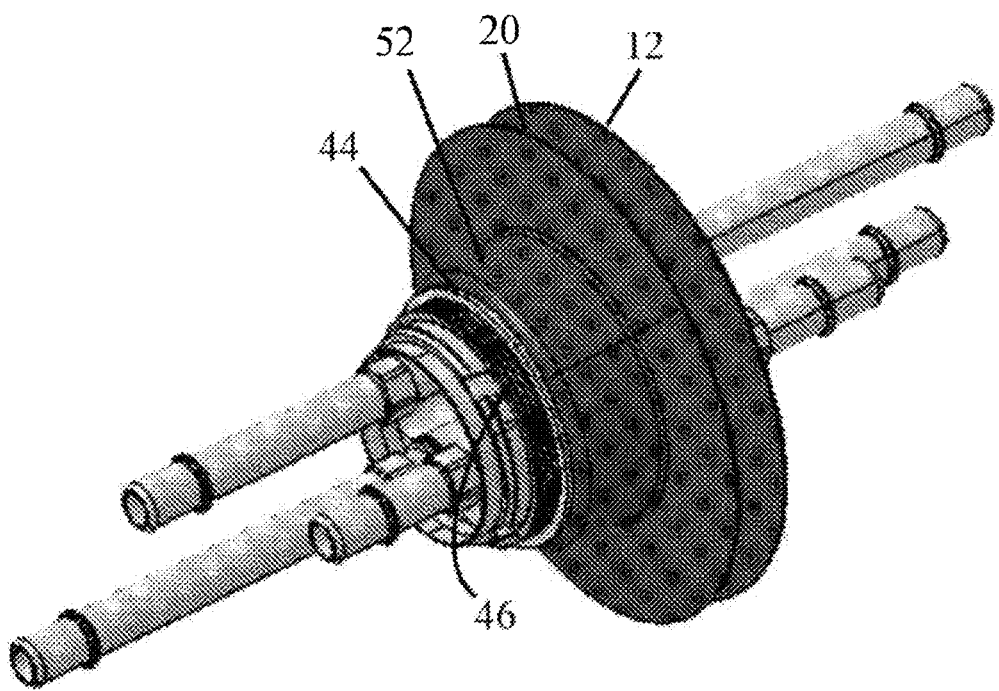
FIG. 7 shows a side perspective view of FIG. 6, with a spring positioned on the main body.
Figure 8:
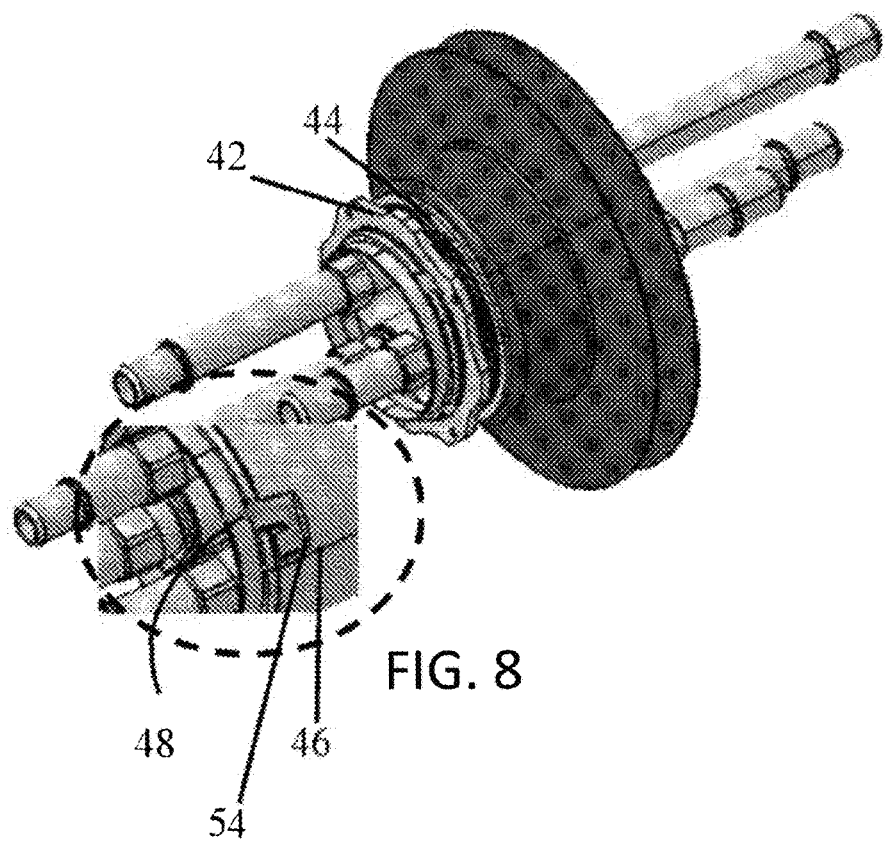
FIG. 8 shows a side perspective view of FIG. 7, with a notched ring positioned on the main body.

In use, as shown in FIG. 7, a spring 44 is initially positioned onto the main body 30, against an extending member 52 of the chimney 20. The spring is compressed by positioning of the notched ring 42 as shown in FIG. 8. Ring 42 has a plurality of notches 50 extending around the ring circumference. In the example shown by FIG. 3, there are four notches 50 spaced equidistantly around the ring 42. However, it should be understood that any appropriate number of notches may be provided. Each notch is generally formed as an inward protrusion. The shape of the notch 50 corresponds to the shape of the edge opening 48 of the edge receiver 46. In use, the notch 50 follows the groove formed by the edge received 46. Once fully positioned, the notch 50 is engaged in the end groove 54 of the edge receiver 46. In a specific example, the end groove 54 is shaped like the end of the "J," such that compression energy against the notched ring 42 via the spring 44 presses and holds with respect to notch 50 into the end groove 54. This locks the notched ring 42 in place, which correspondingly locks the second chimney 20 in place with respect to the main body 30.

Figure 9:
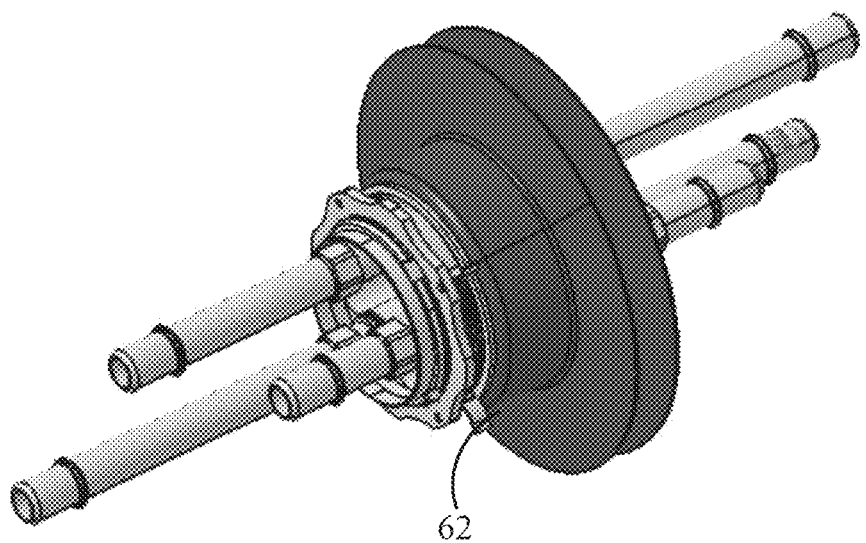
FIG. 9 shows a side perspective view of FIG. 8, with a lock ring positioned on the main body.

The second locking system 60 is provided by lock ring 62. As illustrated by FIG. 3, lock ring 62 may be U-shaped, such that it can be positioned around the spring 44 and main body 30. In use, lock ring 62 provides a clamping force that secures the notched ring 42 in place. It provides a secondary lock in the event of failure of the spring. Lock ring 62 prevents movement of the chimney 20 away from the main body 30. FIG. 9 illustrates lock ring 62 positioned in use.

Figure 10:
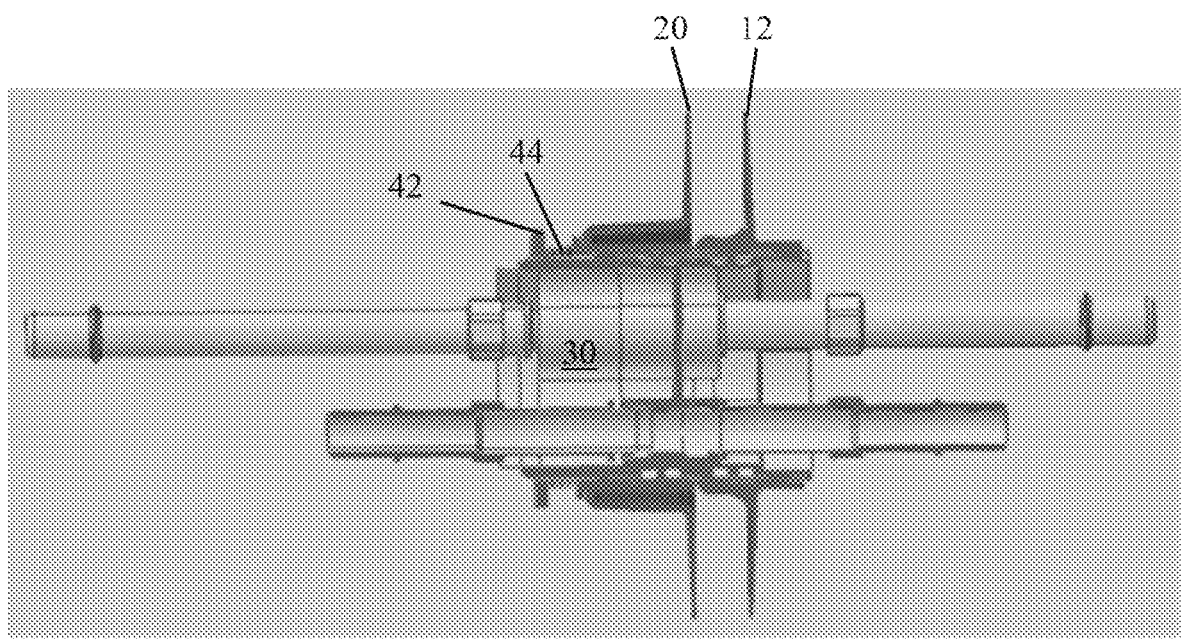
FIG. 10 shows a side cross-sectional view of an assembled fuel tank connection system.

FIG. 10 is a side cross-sectional view of the disclosed interconnection fitting system 10 in use. It shows the two chimneys 12, 20 in securement with one another, positioned around the main body 30 and locked thereto. The secure assembly of the two chimneys 12, 20 into each other as shown and described seals the connection. In order to prevent leakage, the intercom fitting must be sized properly, in relation to the internal pressure generated by the fuel transfer and crash effect. It should also meet ESD (electrostatic discharge) requirements. According to required standards, the intercom fitting must incorporate two separate locking devices, as a fail-safe measure, according to CS§ 29.607. The assembly should also have certain crashworthiness capabilities. For example, in one embodiment, the intercom assembly should resist drop tests as per CS§ 29.952. Selected materials for the intercom fitting may be, for example, a lightweight metal or alloy (such as 2024 aluminum) or a high-performance thermoplastic polymer (such as Polyphthalamide (PPA) with ESD properties) for mass saving. These are non-limiting examples only. In order to ease the assembly and the maintenance, the two independent locking devices are preferably fastened together through easy movements, preferably without specific tooling requirements.

Changes and modifications, additions and deletions may be made to the structures and methods recited above and shown in the drawings without departing from the scope or spirit of the invention and the following claims.

What is claimed is:

1. A fuel tank communication system, comprising
a first chimney configured to be secured to a first fuel bladder;
a second chimney configured to be secured to a second fuel bladder;
each chimney comprising a central opening;
a main body configured to be received by a central openings of each of the first and second chimneys, the main body comprising a plurality of connections extending therefrom;
a securement feature for maintaining cooperation between the first chimney and the main body; and
first and second locking systems for maintaining cooperation between the second chimney and the main body,
wherein the first and second locking systems comprise independent locking systems, with the first locking system comprising a notched ring and a spring, and with the second locking system comprising a lock ring,
wherein the main body comprises a rear shoulder,
wherein the plurality of connections function as vent tubes or re-fueling tubes.

2. The system of claim 1, wherein the securement feature comprises a C-clip.

3. The system of claim 1 wherein the notched ring comprises a plurality of notch protrusions.

4. The system of claim 1, wherein the main body comprises at least one edge receiver configured to receive at least one notch of the notched ring.

5. The system of claim 4, wherein the at least one edge receiver comprises an edge opening and an end groove.

6. The system of claim 1, wherein main body comprises a plurality of edge receivers.

7. The system of claim 1, wherein main body comprises a seal portion.

8. The system of claim 1, wherein the first fuel bladder and second fuel bladder may be connected or disconnected via access to only one of the first or second bladders.

9. A method for connecting two tanks, comprising:
a. providing the fuel tank communication system of claim 1;
b. securing the first chimney to the main body via a securement feature;
c. securing the second chimney to the main body via the first locking system comprising a notched ring and a spring, wherein the main body comprises an edge receiver that receives at least one notch of the notched ring; and
d. securing the second chimney to the main body via the second locking system comprising a lock ring.

* * * * *